United States Patent [19]

Yokoyama

[11] Patent Number: 4,558,901

[45] Date of Patent: Dec. 17, 1985

[54] ARM REST DEVICE OF A SEAT FOR A VEHICLE

[75] Inventor: Sho Yokoyama, Akishima, Japan

[73] Assignee: Tachikawa Spring Co., Ltd., Japan

[21] Appl. No.: 525,819

[22] Filed: Aug. 23, 1983

[51] Int. Cl.[4] .......................... A47C 13/00; B60N 1/06
[52] U.S. Cl. ..................................... 297/113; 297/411
[58] Field of Search ............... 297/113, 417, 411, 357;
248/242; 292/338

[56] References Cited

U.S. PATENT DOCUMENTS

| | | | |
|---|---|---|---|
| 156,199 | 11/1949 | Cadwallader | 297/113 X |
| 1,149,421 | 8/1915 | Wilmot | 297/357 X |
| 2,710,049 | 6/1955 | Potocnik | 297/113 |
| 3,594,040 | 7/1971 | Monroe | 297/357 X |
| 3,807,799 | 4/1974 | Freedman | 297/417 |

*Primary Examiner*—William E. Lyddane
*Assistant Examiner*—José V. Chen
*Attorney, Agent, or Firm*—Cushman, Darby & Cushman

[57] ABSTRACT

An arm rest device is disclosed in which a base plate, supported onto a bracket in a seat-back by means of link mechanisms, is mounted to an arm rest body in such a manner to be free to slide fore and aft and is also connected with a connecting pin of the arm rest body by means of a spring. If the arm rest body is pushed against the elastic forces of the spring, then such connection is removed and thus the arm rest body is free to move. Then, if the pressure is released, the connecting pin is caused to engage with a predetermined tooth groove in the base plate so that the angle of the arm rest body is adjusted. Thus, the inclining angle of the arm rest body can be adjusted by pushing it directly, which eliminates the provision for any knob, handle or the like.

Further, the arm rest body can be adjusted such that it always maintains its horizontal position even when the seat-back is inclined.

4 Claims, 6 Drawing Figures

ARM REST DEVICE OF A SEAT FOR A VEHICLE

BACKGROUND OF THE INVENTION

1. Field of the Invention

This invention relates to an arm rest device provided in a seat for an automobile or aircraft, and in particular to an arm rest device which is adjustable to a desired angle according to the inclination of the seat.

2. Description of the Prior Art

Conventionally, for example, there has been provided at the central portions of a seat-back of a rear seat in an automobile a storage recess for storing an arm rest in such a manner that the arm rest can be drawn out by a link device of the like as necessary. In particular, the conventional arm rest is arranged such that it can be drawn out and rest upon a seat cushion according to the need, that is, when one or two persons are seated in the rear seat. Since such an arm rest is arranged to be moved as the seat-back is inclined and thus to be changed in angle relative to the seat cushion, the arm rest is somewhat inconvenient in that it tends to take an unnatural attitude when one or two seat occupants place their arms on the arm rest.

Accordingly, in view of the drawback mentioned above, the present invention aims at providing an improved arm rest device to be mounted in a seat-back of a rear seat in which an arm rest body can be adjusted in angle vertically relative to the seat-back and also in which the arm rest body can be so adjusted in angle as to ideally suit a seat occupants posture even when the seat-back is inclined and moved for some reason.

BRIEF SUMMARY OF THE INVENTION

In brief, the above-mentioned object as well as other objects, features, and advantages of the present invention can be achieved in the following manner:

A pair of brackets are mounted respectively at right and left sides within a storage recess for storing an arm rest body which is formed in a seat-back. A pair of base plates are provided such that they are supported by these brackets so as to be rotatably moved from a vertical position to a horizontal position by means of two links. The base plates are mounted to the arm rest body such that they are free to slide, and further the base plates are provided with a plurality of tooth grooves in a direction perpendicular to the sliding direction, whereby the base plates are biased in a direction of the tooth grooves so as to engage a connecting pin provided in the arm rest body with one of the tooth grooves.

Then, if the arm rest body is drawn out of the storage recess in the seat-back, and is further pressed down directly, the connecting pin in the arm rest body is disengaged out of the tooth groove in the base plate and thus the arm rest body becomes free to rotate. If, after being rotated to a predetermined angle, the arm rest body is released from being pressed down, then the force of the spring enables the connecting pin to be engaged with the tooth groove at a predetermined position, so that the inclination of the arm rest body can be adjusted.

The links may be arranged such that the base plates to be mounted to the arm rest body can be rotated relative to the brackets over a range extending from the horizontal to vertical positions.

Each of the base plates is provided with an elongated bore in its longitudinal direction through which a bolt fixed on the side surface of the arm rest body is inserted and thus the base plate can be attached to the arm rest body in such a manner to be free to slide fore and aft.

The spring is stretched between a bush into which the bolt is fitted and a shaft pin for fixing the links to the base plate, and biases the base plate to engage its tooth groove with the connecting pin in the arm rest body.

The above-mentioned object as well as other objects, features and advantages of the present invention will be more apparent to those who are skilled in the art by reading the following detailed description with reference to the appended drawings. In the drawings, which illustrate typical embodiments of this invention, the same reference numerals represent the same or corresponding portions throughout the various Figures.

DETAILED DESCRIPTION OF THE EMBODIMENTS OF THE INVENTION

Figure 1:
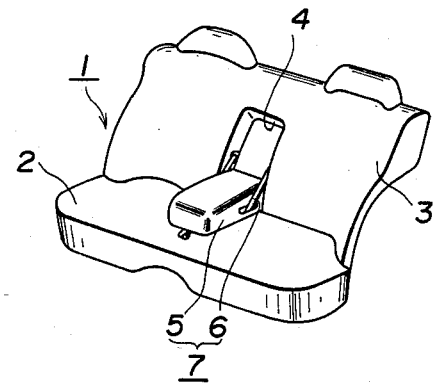
FIG. 1 is a perspective view of a seat for a vehicle incorporating the present invention.
Figure 2:
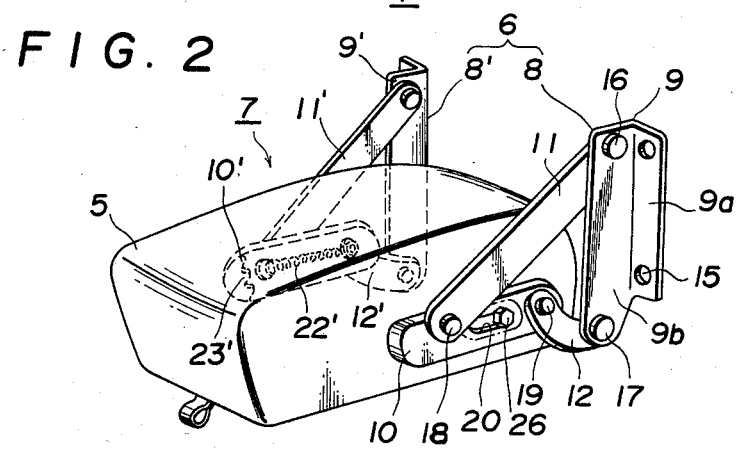
FIG. 2 is a perspective view of an embodiment of an arm rest device according to the present invention.
Figure 3:
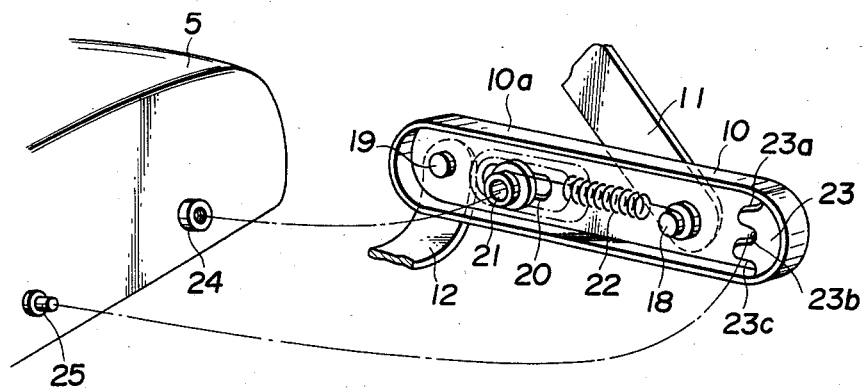
FIG. 3 is an exploded perspective view of the arm rest device in FIG. 2.
Figure 4:
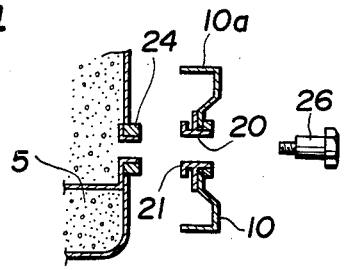
FIG. 4 is an exploded sectional view of the arm rest device of the present invention.
Figure 5:
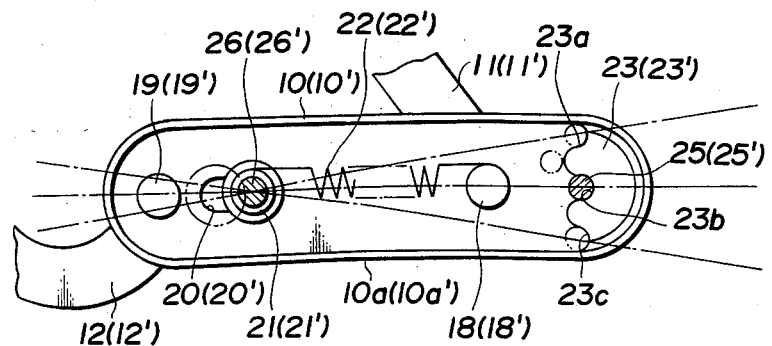
FIG. 5 is an inner side elevation of the base plate of the arm rest device of the invention; and, FIG. 6 is an explanatory view of the operation of the arm rest device of the present invention.

In FIG. 1, (1) designates an entire rear seat for an automobile, (2) represents a seat cushion and (3) shows a seat-back. In the central portions of the seat-back, there is provided a storing recess (4), within which an arm rest body (5) and a link device (6) cooperating to form an arm rest device (7) are mounted.

With reference to FIGS. 2 to 6, we will describe the arm rest device (7) in detail. Since the link device (6) comprises two identical link mechanisms (8), (8') respectively provided at each side of the arm rest body (5), only one of them (8) is to be described in this specification, while the other link mechanism is designated by adding a prime (') to the corresponding member, or, by (8') with no special reference.

The link mechanism (8) consists of a bracket (9), a base plate (10) and two link arms (11),(12) connecting the bracket (9) and base plate (10). The bracket (9) has an L-shaped cross section and comprises a horizontal half section (9a) and a vertical half section (9b). The horizontal half section (9a) is provided at its upper and lower portions with attaching holes (15) respectively, through which the bracket (9) can be secured to a frame when it is stored within the storing recess (4) of the seat-back (3). The upper and lower portions of the vertical half section (9b) are pivotally secured to the ends of the link arms (11),(12) by means of shaft pins (16),(17), respectively. One link arm (11) and the other link arm (12) are formed respectively in a long rectangular plate and in a short arc plate. The other ends of both of these link arms (11),(12) are pivotably secured to the front side and rear side of the base plate (10) by means of shaft pins (18),(19), respectively, so that they can support the base plate (10) to the bracket (9) in such a manner to be able to rotatively move it from a vertical position to a horizontal position.

Base plate (10) is further provided at its internal surface side with a flange (10a) along its peripheral edges, and also is provided at its rear half portion with an elongated bore (20) through which a bush (21) is fitted in such a manner as to be able to move fore and aft, with the bush (21) being always biased forward by a spring (22) stretched between the shaft pin (18) and the bush itself. Further, there is fixed to the inner surface side of the top portion of the base plate (10) a tooth plate (23) which is located within the flange (10a) and has a plurality of tooth grooves (23a), (23b), (23c) in a vertical direction.

With the link mechanism (8) arranged as above, the bracket (9) is fixed to the frame when stored within the storage recess (4) of the seat-back (3), and the base plate (10) is mounted onto the side surface of the arm rest body (5).

The arm rest body (5) has on its side surface a nut (24) to mate with the bush (21) fitted into the base plate (10) and a connecting pin (25) projected therefrom to be connected with the tooth plate (23). The base plate (10) can be mounted onto the side surface of the arm rest body (5) by contacting the base plate (10) onto the side surface of the arm rest body (5), connecting the bush (21) with the nut (24), engaging the tooth groove of the tooth plate (23) with the connecting pin (25), threadedly engaging a stepped bolt (26) into the nut (24) through the bush (21), and finally tightening the bolt.

Similarly, the base plate (10') of the other link mechanism (8') is attached to the other side surface of the arm rest body (5).

Thus, the arm rest body (5) is mounted within the storage recess (4) of the seat-back (3) with its both sides being supported by the respective link mechanisms (8),(8') such that it is free to rise and fall or it is free to be retreated and be pulled out.

In the thus arranged arm rest device (7), when the arm rest body (5) is pulled out of the storage recess (4) of the seat-back (3) so that it rests upon the seat cushion (2) and is then pushed rearwardly, the arm rest body (5) is moved along the elongated bore (20) in the base plate (10) by means of the bush (21) and bolt (26) to disengage the connecting pin (25) out of the tooth groove in the tooth plate (23). As the result of this, the arm rest body (5) is rotatable vertically about the journal of the bush (21) and bolt (26) within the range in which the connecting pin (25) is abutted against the upper and lower portions of the flange (10a) of the base plate (10).

Figure 6:
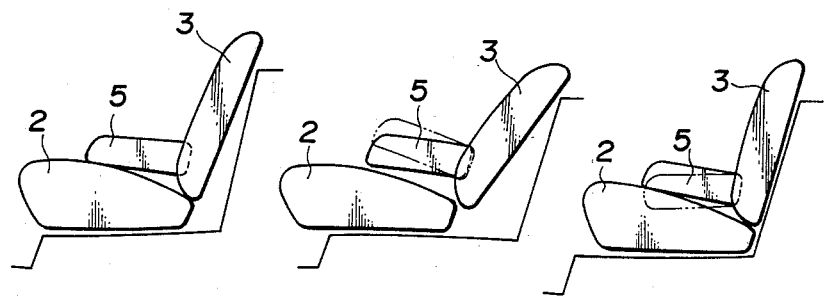

If the arm rest body (5) is rotatively inclined to a desired angle and then the rearward pressure applied thereto is released, then the arm rest body (5) is moved forward by the biasing forces of the spring (22) through the bush (21) and bolt (26) to cause the connecting pin (25) to be engaged with the opposing tooth groove of the tooth plate (23), so that the arm rest body (5) can be held in this inclined state. Therefore, as shown in FIG. 6, the best position for the arm rest device can be set by only changing or adjusting the inclination of the arm rest body (5) relative to the seat-back (3) in response to the inclined position of the seat-back.

According to the invention, the change or adjustment of the inclination of the arm rest body (5) can be achieved by directly pressing the arm rest body (5) itself or by moving it upward or downward without using any knob, handle or the like. Thus, the present invention is simple to operate. Also, since the arm rest body (5) of the present invention includes no projections at its outside, the present invention is safe and will never impair the comfort of the seater when the arm rest body (5) is not used, that is, when it is stored within the storage recess (4) of the seat-back (3).

Although the link mechanisms (8),(8') have been illustrated in this specification and in the accompanying drawings, the present invention is not limited by them; but, other suitable arrangements can be employed in which the base plate (10) to be mounted at the side of the arm rest body (5) can be moved relative to the brackets (9),(9') between the horizontal and vertical positions. Also, instead of the tooth plates (23),(23') fixed to the base plates (10),(10'), a window bore having tooth grooves may be provided in each of the base plates (10),(10') into which each of the connecting pins (25),(25') is engaged.

As have been described hereinbefore, according to the invention, the arm rest body of the arm rest device to be mounted in the seat-back for a vehicle seat is arranged such that it can be angularly adjusted upwardly or downwardly while it is fallen down. Thus, even when the seat-back is adjusted in its inclination by a reclining operation, the most suitable arm rest position can be set by adjusting the inclination of the fallen-down arm rest body relative to the seat-back, so that the seater can enjoy a natural seating attitude which will reduce his or her fatigue of a long seating. Accordingly, this invention is greatly effective when in use for seats in an automobile and aircraft.

What is claimed is:

1. An arm rest for a vehicle seat comprising an arm rest body; and linkage means adapted for pivotally mounting said arm rest body to the vehicle seat so that said arm rest body is pivotally movable between an inoperative position and an operative position, said linkage means including inclination adjustment means for permitting the selective inclination of said arm rest body between a plurality of arm rest positions when said arm rest body is in said operative position, said inclination adjustment means including, a base plate coupled to said linkage means and having shaft means to pivotally mount said base plate to said arm rest body so that said arm rest body is pivotally movable about said shaft means relative to said base plate;

said base plate also including means defining a slot for receiving said shaft means to also mount said base plate to said arm rest body so that said arm rest body is reciprocally displaceable relative to said base plate between forward and rearward positions;

tooth plate means rigidly associated with said base plate for defining a plurality of teeth each of which establishes a respective one of said arm rest positions;

connecting pin means rigidly associated with said arm rest body for engaging a predetermined one of said defined teeth to thereby releasably retain said arm rest body in said arm rest position established by said predetermined one of said defined teeth; and biasing means for exerting a biasing force to said arm rest body which tends to move said arm rest body into said forward position thereby causing said connecting pin means to engage said predetermined one of said defined teeth; wherein said arm rest body is forcibly displaceable relative said base plate into said rearward position to cause disengagement between said connecting pin means and said predetermined one of said defined teeth to responsively permit said arm rest to be pivotally moved relative said base plate about said shaft means to another of said arm rest positions, said biasing means, upon release of said forcible displacement into said rearward position, thereby forwardly displacing said arm rest body to responsively effect interengagement between said connecting pin means and another one of said defined teeth which corresponds to said another arm rest position, whereby the inclination of said arm rest body is adjusted.

2. The arm rest as in claim 1 wherein said linkage means includes a pair of brackets to be rigidly connected to the vehicle seat and a pair of link arms respectively connecting said pair of brackets to said base plate.

3. The arm rest as in claim 2 wherein said base plate includes a shaft pin to pivotally connect a respective link arm to said base plate and wherein said biasing means includes a spring extended between said bushing and said shaft pin.

4. The arm rest as in claim 1 wherein said shaft means includes a bushing provided with said base plate so as to be slidable within said slot and a bolt inserted through said bushing and fastened to said arm rest body, whereby said base plate is mounted onto a side surface of said arm rest body so as to be slidable between said forward and rearward positions.

* * * * *